US012617951B2

(12) United States Patent
Aoyama et al.

(10) Patent No.: US 12,617,951 B2
(45) Date of Patent: May 5, 2026

(54) STEEL SHEET AND METHOD FOR PRODUCING THE SAME

(71) Applicant: JFE STEEL CORPORATION, Tokyo (JP)

(72) Inventors: Tomohiro Aoyama, Tokyo (JP); Shun Koibuchi, Tokyo (JP); Shinichi Furuya, Tokyo (JP); Takeshi Matsuda, Tokyo (JP); Takashi Kawano, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 18/847,347

(22) PCT Filed: Mar. 15, 2023

(86) PCT No.: PCT/JP2023/010198
§ 371 (c)(1),
(2) Date: Sep. 16, 2024

(87) PCT Pub. No.: WO2023/182114
PCT Pub. Date: Sep. 28, 2023

(65) Prior Publication Data
US 2025/0215248 A1 Jul. 3, 2025

(30) Foreign Application Priority Data

Mar. 25, 2022 (JP) ................................ 2022-049831

(51) Int. Cl.
| | |
|---|---|
| *B05D 3/02* | (2006.01) |
| *B05D 7/14* | (2006.01) |
| *B05D 7/24* | (2006.01) |
| *C09D 7/40* | (2018.01) |
| *C09D 7/65* | (2018.01) |

(52) U.S. Cl.
CPC ............. *C09D 7/65* (2018.01); *B05D 3/0254* (2013.01); *B05D 7/14* (2013.01); *B05D 7/24* (2013.01); *C09D 7/67* (2018.01); *C09D 7/68* (2018.01)

(58) Field of Classification Search
CPC ... C09D 7/65; C09D 7/67; C09D 7/68; C09D 5/008; C09D 133/00; C09D 133/08; B05D 3/0254; B05D 7/14; B05D 7/24; B05D 2202/10; C08L 91/06
See application file for complete search history.

(56) References Cited

U.S. PATENT DOCUMENTS

2018/0345317 A1* 12/2018 Hirasawa ................. C09D 5/00

FOREIGN PATENT DOCUMENTS

| | | |
|---|---|---|
| EP | 0 810 084 A1 | 12/1997 |
| EP | 1 099 485 A2 | 5/2001 |
| EP | 3 385 344 A1 | 10/2018 |
| JP | H0577357 B2 | 3/1993 |
| JP | H05-237449 A | 9/1993 |
| JP | H07-080403 A | 3/1995 |
| JP | H09170059 A | 6/1997 |
| JP | H09-267073 A | 10/1997 |
| JP | H1052881 A | 2/1998 |
| JP | 2000167981 A | 6/2000 |
| JP | 2000309747 A | 11/2000 |
| JP | 2013094784 A * | 5/2013 |
| JP | 2017105986 A | 6/2017 |

OTHER PUBLICATIONS

J. Lindstedt, Deposit Thickness in Surface Finishing: The Misunderstood Variable, Advanced Plating Technologies (Nov. 14, 2016), https://advancedplatingtech.com/blog/deposit-thickness/. (Year: 2016).*
International Search Report (PCT/ISA/210) with translation and Written Opinion (PCT/ISA/237) mailed on Jun. 13, 2023, by the Japan Patent Office as the International Searching Authority for International Application No. PCT/JP2023/010198. (10 pages).
Extended European Search Report issued Apr. 28, 2025, by the European Patent Office in corresponding European Patent Application No. 23774710.0-1103. (7 pages).
Office Action (Notice of Reasons for Refusal) issued Feb. 20, 2024, by the Japan Patent Office in corresponding Japanese Patent Application No. 2023-539323 and an English translation with Concise Statement of Relevance of the Office Action. (12 pages).

* cited by examiner

*Primary Examiner* — William P Fletcher, III
(74) *Attorney, Agent, or Firm* — Buchanan Ingersoll & Rooney PC

(57) ABSTRACT

A steel sheet includes a base steel sheet and a film disposed on at least one side of the base steel sheet. In the steel sheet, the film includes an organic resin and a wax, the arithmetic average roughness Ra of the base steel sheet is 0.4 μm or more, the organic resin is at least one resin selected from acrylic resins, epoxy resins, urethane resins, phenolic resins, vinyl acetate resins, and polyester resins, the wax is a polyolefin wax with a melting point of 120° C. or above and 140° C. or below and an average particle size of 3.0 μm or less, the fraction of the wax in the film is 10 mass % or more, and the standard deviation σ of the film coating weight distribution per side is less than 0.9 g/m².

13 Claims, 4 Drawing Sheets

```
··········· FILM THICKNESS DISTRIBUTION AT PROJECTIONS
----- FILM THICKNESS DISTRIBUTION AT DEPRESSIONS
——— FILM THICKNESS DISTRIBUTION IN WHOLE FILM
```

(a) WHEN DIFFERENCE IN FILM THICKNESS BETWEEN
PROJECTIONS AND DEPRESSIONS IS SMALL:

(b) WHEN DIFFERENCE IN FILM THICKNESS BETWEEN
PROJECTIONS AND DEPRESSIONS IS LARGE:

(a) WHEN COATING WEIGHT IS SMALL:

(b) WHEN COATING WEIGHT IS NORMAL:

(c) WHEN COATING WEIGHT IS LARGE:

| ············ FILM THICKNESS DISTRIBUTION AT PROJECTIONS | - - - - FILM THICKNESS DISTRIBUTION AT DEPRESSIONS | ———— FILM THICKNESS DISTRIBUTION IN WHOLE FILM |
|---|---|---|

(a) WHEN STEEL SHEET ROUGHNESS IS SMALL:

(b) WHEN STEEL SHEET ROUGHNESS IS NORMAL:

(c) WHEN STEEL SHEET ROUGHNESS IS LARGE:

STEEL SHEET AND METHOD FOR PRODUCING THE SAME

CROSS REFERENCE TO RELATED APPLICATIONS

This is the U.S. National Phase application of PCT/JP2023/010198, filed Mar. 15, 2023 which claims priority to Japanese Patent Application No. 2022-049831, filed Mar. 25, 2022, the disclosures of these applications being incorporated herein by reference in their entireties for all purposes.

FIELD OF THE INVENTION

The present invention relates to a steel sheet that excels in sliding characteristics at press forming and to a method for producing such a steel sheet. In particular, aspects of the present invention relates to a steel sheet with a lubricant film that exhibits excellent formability even under severe drawing conditions, and to a method for producing such a steel sheet.

BACKGROUND OF THE INVENTION

Cold rolled steel sheets and hot rolled steel sheets are widely used in a broad range of fields mainly based on automobile bodies. In such applications, those steel sheets are used after being press formed. In recent years, parts are integrated to simplify the process and more sophisticated designs are demanded. Thus, steel sheets require more complex formability.

Complex press forming may cause significant adverse effects on automobile productivity. For example, the steel sheet may fail to withstand the forming and be ruptured, or die galling may occur during continual press forming.

Surface treatment on a die is a method widely used to enhance the press formability of cold rolled steel sheets and hot rolled steel sheets. Unfortunately, this method has drawbacks in that the die cannot be adjusted after surface-treated and that the costs are high. Thus, improved press formability of steel sheets themselves is strongly demanded.

The use of highly viscous lubricating oils is an approach to obtain enhanced press formability without die surface treatment. In this case, however, press-formed steel sheets may not be degreased completely and may exhibit low paintability.

Thus, various lubricant surface-treated steel sheets are being studied as techniques that enable press forming without die surface treatment or without using a highly viscous lubricating oil.

Patent Literature 1 describes a metal sheet that is coated with a lubricant film in which a solid lubricant protrudes 0.01 to 1.5 μm from the surface of a resin film.

Patent Literature 2 describes a surface-lubricated metal article with excellent press formability that is coated with a 0.5 to 5 μm film containing a polyurethane resin and a lubricant.

Patent Literature 3 describes a technique in which an alkali-soluble organic film containing an epoxy resin and a lubricant is formed on a steel sheet.

PATENT LITERATURE

PTL 1: Japanese Unexamined Patent Application Publication No. 10-52881

PTL 2: Japanese Unexamined Patent Application Publication No. 2000-309747

PTL 3: Japanese Unexamined Patent Application Publication No. 2000-167981

SUMMARY OF THE INVENTION

Although the techniques disclosed in Patent Literatures 1 to 3 offer lubricity by the lubricating effect of, for example, the lubricant that is contained, the press formability is not necessarily sufficient when the forming is complicated.

Aspects of present invention have been made in view of the circumstances discussed above. Therefore, an object of aspects of the present invention is to provide a steel sheet for complicated and difficult press forming which exhibits low sliding resistance when there is a risk of cracking during press forming and which exhibits excellent press formability when a high contact pressure is applied and thus die galling is expected to occur.

Steel sheets used for automobiles are required to be sufficiently cleaned of a lubricant film in an alkaline degreasing step during a painting process. It is a further object of aspects of the present invention that the steel sheet used for such an application also has good film removability.

The present inventors carried out intensive studies directed to solving the problems discussed above. As a result, the present inventors have found that press formability is dramatically improved and the problems described above can be solved by forming on a surface of a base steel sheet an organic resin film that contains a polyolefin wax with a melting point of 120° C. or above and 140° C. or below and an average particle size of 3.0 μm or less and by controlling the surface roughness of the base steel sheet and the film coating weight distribution to specific ranges so that the standard deviation $\sigma$ of the film coating weight distribution of the organic resin film per side will be less than 0.9 g/m². Furthermore, the present inventors have found that press formability can be further improved by controlling the film coating weight, the arithmetic average roughness Ra of the base steel sheet, the average particle size of the wax, and the fraction of the wax in the film to suitable ranges.

Aspects of the present invention have been completed based on the above findings, and are as follows.

Incidentally, the base steel sheet is the steel sheet serving as the base on which the film containing an organic resin and a wax is present, that is, the portion excluding the film. The base steel sheet may be a cold rolled steel sheet or a hot rolled steel sheet.

[1] A steel sheet including a base steel sheet and a film disposed on at least one side of the base steel sheet, wherein the film includes an organic resin and a wax, the arithmetic average roughness Ra of the base steel sheet is 0.4 μm or more, the organic resin is at least one resin selected from acrylic resins, epoxy resins, urethane resins, phenolic resins, vinyl acetate resins, and polyester resins, the wax is a polyolefin wax with a melting point of 120° C. or above and 140° C. or below and an average particle size of 3.0 μm or less, the fraction of the wax in the film is 10 mass % or more, and the standard deviation $\sigma$ of the film coating weight distribution per side is less than 0.9 g/m².

[2] The steel sheet according to [1], wherein the film coating weight W per side is 2.0 g/m² or less.

[3] The steel sheet according to [1] or [2], wherein the arithmetic average roughness Ra of the base steel sheet is 0.4 μm or more and 2.5 μm or less.

[4] The steel sheet according to any one of [1] to [3], wherein the average particle size of the wax is 0.01 μm or more and 0.5 μm or less.

[5] The steel sheet according to any one of [1] to [4], wherein the fraction of the wax in the film is less than 50 mass %.

[6] The steel sheet according to any one of [2] to [5], wherein the film coating weight W per side is 0.9 g/m² or less.

[7] The steel sheet according to any one of [1] to [6], wherein the organic resin is an alkali-soluble resin.

[8] A steel sheet production method for producing the steel sheet described in any one of [1] to [7], including applying a paint including the organic resin and the wax described in any one of [1] to [7] to at least one side of the base steel sheet, and drying the paint.

[9] The steel sheet production method according to [8], wherein the paint has a viscosity of 1.5 mPa·s or more and 8.0 mPa·s or less.

The steel sheet production method according to [8] or [9], wherein the maximum temperature of the base steel sheet reached during the drying is 60° C. or above and 140° C. or below, and the drying time in the drying is 2 seconds or more and 150 seconds or less.

The steel sheet obtained according to aspects of the present invention has a markedly low coefficient of friction with respect to a die or the like and thus exhibits excellent press formability. That is, aspects of the present invention enable a steel sheet with relatively low strength to undergo complicated forming while stably exhibiting excellent press formability.

Even when the steel sheet is a high-strength steel sheet that is subjected to a high contact pressure during press forming, aspects of the present invention allow the steel sheet to exhibit low sliding resistance when there is a risk of cracking during press forming and to exhibit excellent press formability when a high contact pressure is applied and thus die galling is expected to occur.

Furthermore, the steel sheet obtained herein has good film removability.

The term high-strength mentioned above assumes that the tensile strength (TS) is 440 MPa or more, and the term relatively low strength assumes that the TS is less than 440 MPa.

DETAILED DESCRIPTION OF EMBODIMENTS OF THE INVENTION

Figure 1:
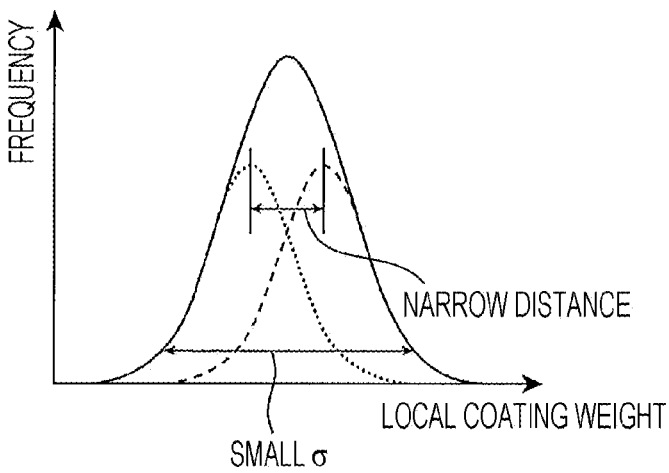
FIG. 1 is a set of diagrams illustrating local film coating weight distributions for the case where steel sheets have different differences in film coating weight between depressions and projections of the steel sheet.
Figure 1:
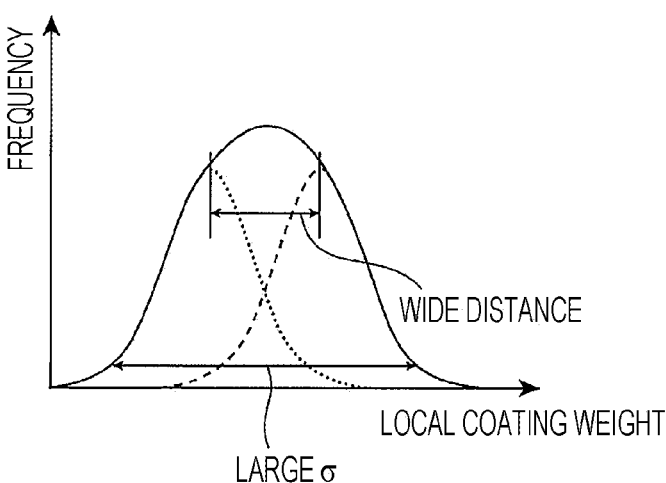

Embodiments of the present invention will be described below.

A steel sheet according to aspects of the present invention includes a base steel sheet and a film disposed on at least one side of the base steel sheet. The film includes an organic resin and a wax. The arithmetic average roughness Ra of the base steel sheet is 0.4 μm or more. The organic resin is at least one resin selected from acrylic resins, epoxy resins, urethane resins, phenolic resins, vinyl acetate resins, and polyester resins. The wax is a polyolefin wax with a melting point of 120° C. or above and 140° C. or below and an average particle size of 3.0 μm or less. The fraction of the wax in the film is 10 mass % or more. Furthermore, the standard deviation σ of the film coating weight distribution per side is less than 0.9 g/m².

The wax used in accordance with aspects of the present invention is not limited as long as it is a polyolefin wax having a melting point of 120° C. or above and 140° C. or below and an average particle size of 3.0 μm or less.

The reason why the polyolefin wax is used as the wax is because it is low in surface energy and has self-lubricating properties to offer good lubricity. Furthermore, the melting point of the polyolefin may be controlled to 120° C. or above and 140° C. or below relatively easily by controlling the density or the molecular weight.

By virtue of the melting point being 120° C. or above and 140° C. or below, the polyolefin wax not only exhibits self-lubricating properties of the wax itself but also is semi-melted by sliding during press forming and is mixed together with the organic resin to form a lubricant film component, which coats the die surface and keeps the steel sheet away from direct contact with the die to realize excellent lubricating effects. If the melting point is below 120° C., the wax is completely melted by the frictional heat produced by sliding during press forming, and fails to offer its lubricating effects sufficiently and also fails to coat the die effectively. If the melting point is above 140° C., the wax is not melted during sliding, and fails to offer sufficient lubricating effects and also fails to coat the die effectively.

When the melting point of the wax is 120° C. or above and 140° C. or below, it is probable that the wax in the film adheres efficiently to and is persistent on the die during a sliding motion at the time of press forming, thus offering high lubricating effects. If the melting point of the wax is below 120° C., the film that has transferred to the die exhibits such low adhesion that the film comes off easily when slid. If the melting point of the wax is above 140° C., the film will not transfer to the die efficiently. It is preferable that the melting point of the wax be 125° C. or above and 135° C. or below.

Here, the melting point of the wax is the melting temperature measured based on JIS K 7121: 1987 "Testing Methods for Transition Temperatures of Plastics". If the average particle size of the wax exceeds 3.0 μm, the wax is less miscible with the organic resin during sliding, and fails to coat the die effectively and does not offer sufficient lubricity. The average particle size of the wax is preferably 1.5 μm or less. The average particle size of the wax is more preferably 0.5 μm or less, and still more preferably 0.3 μm or less.

The particle size of the wax is preferably 0.01 μm or more. If the average particle size of the wax is less than 0.01 μm, the wax tends to be dissolved into a lubricating oil during sliding and sometimes fails to produce sufficient effects in lubricity enhancement. Furthermore, such a wax tends to be aggregated in a paint for forming the film and thus destabilizes the paint. The average particle size of the wax is more preferably 0.03 μm or more.

The average particle size is the volume-average median diameter and is determined by a laser diffraction/scattering method. For example, the average particle size may be determined by analyzing a sample diluted with pure water using laser diffraction/scattering particle size distribution analyzer Partica (registered trademark) LA-960V2 (manufactured by HORIBA, Ltd.).

Among the polyolefin waxes, polyethylene wax is preferably used because the lubricating effects are best obtained by the use of polyethylene wax.

The mass fraction of the wax in the film is limited to 10 mass % or more. If the mass fraction of the wax in the film is less than 10 mass %, sufficient lubricating effects cannot be obtained. Particularly good lubricating effects can be obtained when the mass fraction of the wax in the film is 15 mass % or more. The mass fraction of the wax in the film is preferably less than 50 mass %. If the mass fraction of the wax in the film is 50 mass % or more, the wax is detached easily due to the lack of the base resin component, and the film exhibits poor adhesion to the base steel sheet and may not stay stably. Furthermore, such a steel sheet, when used for automobiles, may not be degreased sufficiently in an alkaline degreasing step during a painting process, and, in some cases, the steel sheet may not be cleaned of the film sufficiently in the alkaline degreasing step even when the organic resin that is used is alkali-soluble, and the paintability may be deteriorated by the film residues. The mass fraction of the wax in the film is more preferably 30 mass % or less.

Here, the fraction of the wax in the film is the ratio of the mass of the solids in the wax in the film to the total mass combining the mass of the solids in the organic resin in the film and the mass of the solids in the wax in the film.

Specifically, the mass fraction is measured as follows. Test specimens having known coating weights of the resin and of the wax on base steel sheets are prepared and analyzed with an FT-IR measurement device to capture infrared absorption spectra. Respective calibration curves of the coating weights of the resin and of the wax are prepared based on the peak intensities respectively assigned to the resin and the wax. Next, the lubricant-coated steel sheet of interest of measurement is analyzed to capture an infrared absorption spectrum. The coating weights of the resin and of the wax are determined from the calibration curves, and the mass fraction of the wax in the film can be thus calculated.

In accordance with aspects of the present invention, the organic resin serves as a binder that holds the wax on the surface of the base steel sheet. As described hereinabove, the wax and the organic resin are mixed with each other during sliding to coat the die and provide a sliding effect. An inorganic binder has low affinity for polyolefins and does not produce such an effect. At least one resin selected from acrylic resins, epoxy resins, urethane resins, phenolic resins, vinyl acetate resins, and polyester resins can be used as the organic resin.

The acrylic resins used in accordance with aspects of the present invention are polymers or copolymers of one or more selected from unsaturated monocarboxylic acids having one carboxyl group in the molecule, such as acrylic acid and methacrylic acid, esters of the unsaturated monocarboxylic acids, and styrene; or derivatives thereof, such as sodium salts, potassium salts, ammonium salts, and amine salts.

The acrylic resins used in accordance with aspects of the present invention are those from fatty acid monomers having one carboxyl group in the molecule, or esters of such fatty acids. The paint stability may be deteriorated if the acrylic resins are from a fatty acid monomer having two or more carboxyl groups in the molecule.

Examples of the epoxy resins include, but are not particularly limited to, bisphenol A epoxy resins, bisphenol F epoxy resins, and novolac epoxy resins.

The urethane resins are not particularly limited but preferably have a carboxyl group in the molecule.

The phenolic resins are not particularly limited. Resol-type phenolic resins that are soluble or dispersible in aqueous solvents are preferable.

The vinyl acetate resins are not particularly limited. Polyvinyl acetate is preferably used.

The polyester resins are not particularly limited. Those polyester resins containing a carboxyl-containing monomer as a constituent component are preferable.

Two or more of the above resins may be used as a mixture. Furthermore, the use of an alkali-soluble organic resin allows for film removal by alkaline degreasing in the painting process and offers good paintability after the film removal.

The components used in accordance with aspects of the present invention may include a surface modifier, an antifoaming agent, and a dispersant in addition to the organic resin and the wax. Furthermore, a rust inhibitor that enhances antirust properties may be added.

In accordance with aspects of the present invention, the film described above was formed with a wide range of coating weight on the surface of the base steel sheets having a wide range of surface roughness, and the press formability was evaluated. The films were also analyzed with a SEM equipped with an X-ray spectrometer or an EPMA to determine their conditions. The present inventors have then found that good press formability is attained stably only when the standard deviation $\sigma$ of the film coating weight distribution on the steel sheet is less than 0.9 $g/m^2$.

In general, the thickness of a film coating on projections of a base steel sheet tends to be smaller with increasing surface roughness of the base steel sheet. At the time of press forming, such thin film portions tend to be scraped off by the slide on the die to expose the underlying base steel sheet, thus producing little lubricating effects.

In contrast, the technique according to aspects of the present invention promotes the transfer of the film component to the die during sliding and provides protection on the die to ensure that the lubricity is not impaired even in the case where the base steel sheet has large roughness.

The contribution of the film to slidability is mainly made by the film components present on projections of the base steel sheet that are brought into contact with the die during press working. In general, a coating paint that is applied tends to accumulate in depressions of a base steel sheet. Thus, the film coating weight tends to be nonuniform between on projections of the base steel sheet and on depressions of the base steel sheet. The film thickness tends to be smaller on projections of the base steel sheet and tends to be larger on depressions of the base steel sheet.

Even when the film coating weight is unchanged, differences in paint characteristics, such as wetting properties of paints, or variations in conditions, such as application conditions and drying conditions, may give rise to an increase or decrease in the weight of the film coating formed on projections of a base steel sheet.

Furthermore, the states of the film coating weight on projections of a base steel sheet (hereinafter, also written simply as projections) and on depressions of the base steel sheet (hereinafter, also written simply as depressions) vary depending on the magnitude of the film coating weight and the roughness of the underlying base steel sheet.

A large difference of the film coating weight between projections and depressions may be caused due to any variations in paint characteristics or conditions, such as application conditions. In this case, the film coating weight is small on projections that are brought into contact with a die during press forming, and consequently press formability is lowered. As illustrated in FIG. 1, the peak showing the film coating weight distribution in the whole film expands in width, and the value of the standard deviation σ is also large.

Figure 2:
FIG. 2 is a set of diagrams illustrating local film coating weight distributions for the case where the average film coating weights are different.
Figure 2:
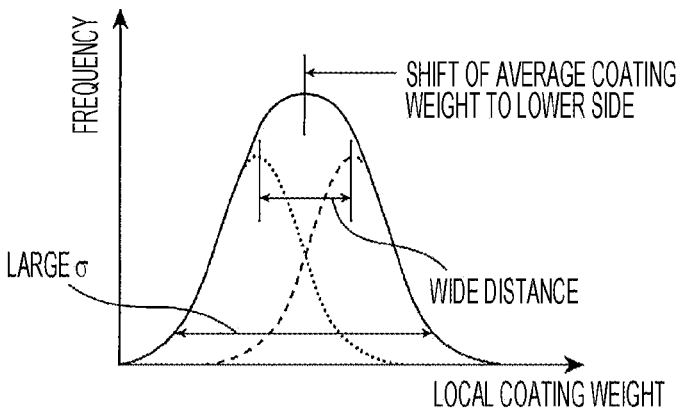
Figure 2:
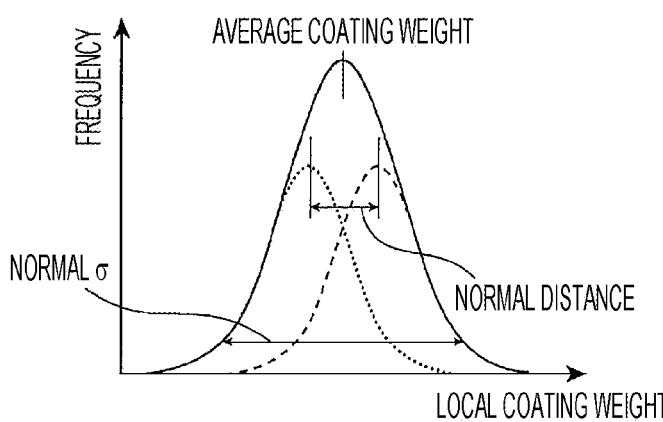
Figure 2:
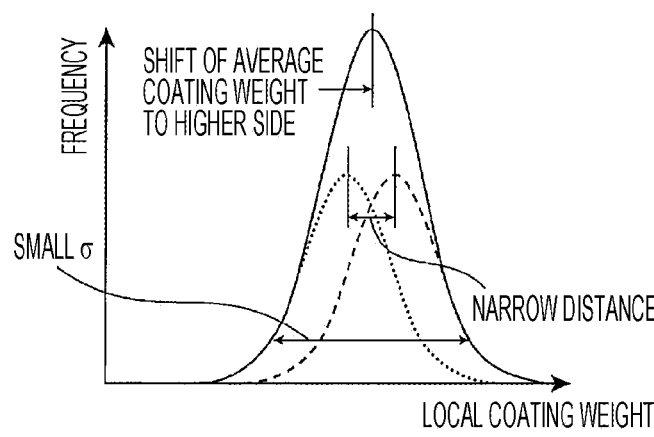

Referring to FIG. 2, a change in average film coating weight alters the profile of the peak showing the film coating weight distribution in the whole film as described below.

When the average film coating weight is small, a sufficient film coating weight is not obtained on projections, and consequently press formability is lowered. In this case, the positions of the peaks of the film coating weight distributions at projections and at depressions shift to the lower coating weight side, and the distance between the peaks of the projections and the depressions is wide. As a result, the peak width of the whole film coating weight distribution is increased, and the value of the standard deviation σ is also large.

When, on the other hand, the average film coating weight is large, a sufficient film coating weight can be obtained on projections, and consequently press formability is enhanced. In this case, the positions of both peaks of the film coating weight distributions at projections and at depressions shift to the higher coating weight side, and the distance between the peaks of the projections and the depressions is narrow. As a result, the peak width of the whole film coating weight distribution is reduced, and the value of the standard deviation σ is also small.

Figure 3:
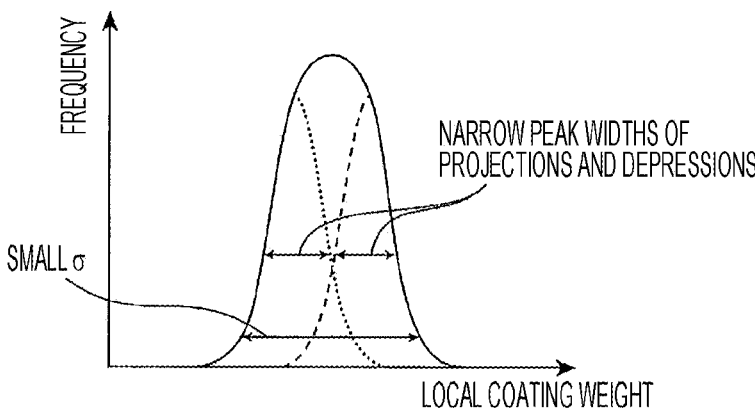
FIG. 3 is a set of diagrams illustrating local film coating weight distributions for the case where base steel sheets have different surface roughnesses.
Figure 3:
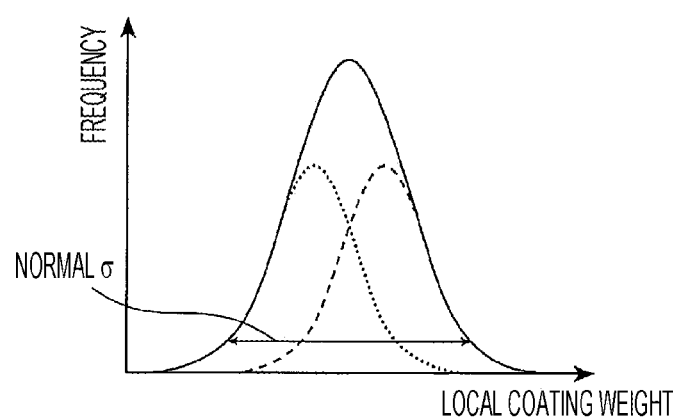
Figure 3:
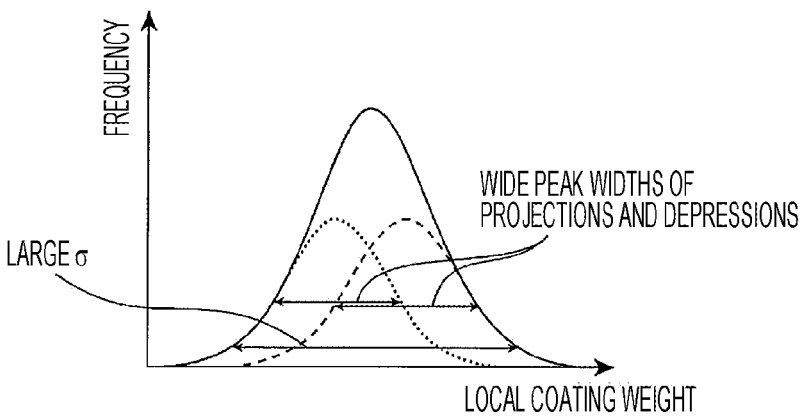

Referring to FIG. 3, the width of the peak showing the film coating weight in the whole film is altered also by a change in the roughness of an underlying base steel sheet. When the roughness of a base steel sheet is small, the variations of the film coating weight distributions at projections and at depressions are small. That is, the film coating weight on projections is stabilized. Consequently, press formability is enhanced. In this case, the peak widths of the film coating weight distributions at projections and at depressions are small. As a result, the peak width of the whole film coating weight distribution is small, and the value of the standard deviation σ is also small.

When, on the other hand, the roughness of a base steel sheet is large, the variations of the film coating weight on projections are large, and consequently press formability is lowered. In this case, the peak widths of the film coating weight distributions at projections and at depressions are large. As a result, the peak width of the whole film coating weight distribution is large, and the value of the standard deviation σ is also large.

As described above, various factors destabilize the film coating weight on projections that are brought into contact with a die, thereby lowering press formability.

When the film coating weight on projections is obtained stably and press formability is good, the standard deviation σ of the film coating weight distribution of the whole film is small. When the film coating weight on projections cannot be obtained stably and press formability is poor, the standard deviation σ is large.

Thus, the quality of press formability can be estimated by evaluating the magnitude of the standard deviation σ of the film coating weight distribution.

The standard deviation σ of the film coating weight distribution may be evaluated by measuring a map of the intensity of C-Kα radiation from the main component of the film, and a map of the intensity of Fe-Kα radiation from the main component of the underlying base steel sheet with SEM equipped with an X-ray spectrometer, and calculating the average value $\mu_{C/Fe}$ and the standard deviation $\sigma_{C/Fe}$ from the intensity ratio map obtained from these maps.

The average value $\mu_{C/Fe}$ is approximately proportional to the film coating weight. Thus, the standard deviation $\sigma_{C/Fe}$ in the C-Kα/Fe-Kα intensity ratio map may be converted into the standard deviation σ of the film coating weight distribution by comparing $\mu_{C/Fe}$ to the film coating weight.

The calibration curve for converting the characteristic X-ray intensity ratio into the film coating weight assumes that the film coating weight measured by a gravimetric method is 0 when the average $\mu_{C/Fe}$ of the characteristic X-ray intensity ratios is 0. That is, the intercept is at the origin. The calibration curve is a straight line connecting the origin and a point obtained based on the film coating weight measured by a gravimetric method and the average $\mu_{C/Fe}$ of the characteristic X-ray intensity ratios. The film coating weight is measured by a gravimetric method in such a manner that the steel sheet coated with the organic resin is submerged in an alkaline solution to dissolve only the organic resin, and the film coating weight is calculated from the change in steel sheet weight before and after the submerge, and the area of the base steel sheet free of the film. The average $\mu_{C/Fe}$ of the characteristic X-ray intensity ratios is the average value of all the data obtained to measure the standard deviation $\sigma_{C/Fe}$ of the film coating weight distribution within the sample.

To obtain the characteristic X-ray maps usable for the evaluation, the acceleration voltage needs to be sufficiently high in order to ensure that the incident electrons can reach even depressions of the underlying base steel sheet where the film coating weight is high and also to ensure that Fe-Kα radiation will be generated with a sufficient intensity. For this purpose, the measurement may be performed at an acceleration voltage of 10 kV or more.

If, however, the acceleration voltage is too high, the efficiency of the generation of C-Kα radiation is lowered and the intensity decreases. It is therefore desirable to perform the observation at 20 kV or less.

Furthermore, the measurement range and the analysis point size in the measurement of the intensity maps used in the evaluation need to be such that the sizes are statistically significant in relation to the shapes of projections and depressions on the steel sheet surface. Provided that the surface roughness of the base steel sheet in the steel sheet is approximately 1 μm, the diameter of projections is approximately 50 μm. It is therefore desirable that the size be 200 μm×200 μm so that the measurement range will include 10 or more projections. Furthermore, the analysis point size is desirably 10 μm or less so that the measurement can be made with respect to 10 or more points for each of the projections.

The field of view for the measurement of the intensity map may be continuous or randomly selected fields may be measured so that the measurement range and the analysis point size will satisfy the above conditions.

The present inventors studied the relationship between the standard deviation σ of the film coating weight distribution calculated as described hereinabove and the coefficient of friction of the film separately measured. As a result, the present inventors have found that a good coefficient of friction is obtained when the standard deviation σ is less than 0.9 g/m².

9

The film coating weight W per side is preferably 2.0 g/m² or less. If the film coating weight W per side exceeds 2.0 g/m², film removability may be deteriorated. The film coating weight W per side is more preferably 1.5 g/m² or less, and particularly preferably 0.9 g/m² or less. Outstanding film removability is obtained when the film coating weight W per side is 0.9 g/m² or less.

The film coating weight may be determined by dividing the difference in weight of the steel sheet before and after the film formation by the area, or by completely removing the film from the film-coated steel sheet with an aqueous alkali solution or an organic solvent and dividing the difference in weight of the steel sheet before and after the film removal by the area.

The arithmetic average roughness Ra of the base steel sheet is 0.4 μm or more. The arithmetic average roughness Ra of the base steel sheet is preferably 2.5 μm or less.

If the arithmetic average roughness Ra of the base steel sheet is less than 0.4 μm, minute scratches that can occur during press forming may become more noticeable, and galling may occur during press forming. If the arithmetic average roughness Ra exceeds 2.5 μm, a larger film coating weight is required to raise the production cost and the sharpness after painting may be deteriorated.

The arithmetic average roughness Ra (μm) of the base steel sheet may be measured in accordance with JIS B 0633: 2001 (ISO 4288: 1996). When, for example, Ra will be greater than 0.1 and 2 or less, the arithmetic average roughness is determined from a roughness curve measured while setting the cutoff value and the reference length to 0.8 mm, and the evaluation length to 4 mm. When Ra will be more than 2 and 10 or less, the arithmetic average roughness is determined from a roughness curve measured while setting the cutoff value and the reference length to 2.5 mm, and the evaluation length to 12.5 mm.

Next, a steel sheet production method according to aspects of the present invention will be described.

The steel sheet production method according to aspects of the present invention is a method for producing a steel sheet including an organic resin film on a surface of the base steel sheet, the organic resin film containing a polyolefin wax with a melting point of 120° C. or above and 140° C. or below and an average particle size of 3.0 μm or less. A paint that is a solution or a dispersion of the organic resin in a solvent or further contains a wax is applied to a surface of the base steel sheet and is dried. Here, the paint is prepared so that C={MB/(MA+MB)}×100 will be C=10 mass % or more where MA is the mass of the solids in the organic resin and MB is the mass of the solids in the wax.

The mass fraction of the film components (the organic resin and the polyolefin wax) in the paint is preferably 1 mass % or more and 25 mass % or less.

The solvent used in the paint is water or an organic solvent.

If the mass fraction of the film components in the paint is less than 1 mass % or is more than 25 mass %, the application may produce an uneven coating. The application may be performed by any method without limitation. Examples of the application methods include the use of a roll coater or a bar coater, spraying, dipping, and brush coating. After the application, the steel sheet may be dried by a common method, for example, hot-air drying, IH heater drying, or infrared heating. The maximum temperature of the steel sheet reached during the drying is preferably 60° C. or above and 140° C. or below. If the maximum temperature is below 60° C., the drying may take a long time and rust inhibition may be lowered. If the maximum temperature exceeds 140° C., the wax particles are melted and combine and the coarsening of particles may deteriorate the lubricity; in addition, the resin is polymerized excessively and the film removability may be deteriorated.

In the steel sheet production method according to aspects of the present invention, good press formability can be obtained when the final steel sheet that is produced has a standard deviation σ of the film coating weight distribution of less than 0.9 g/m².

As an example, the application step may be performed during operation while controlling the film coating weight W (g/m²) of the film per side, the paint viscosity, and the coating conditions so that σ will be less than 0.9 g/m². This production conditions determination process may be implemented as a step constituting the steel sheet production method or may be performed as an individual step.

Specifically, increasing the film coating weight of the film per side reduces the difference of the film coating weight between projections and depressions of the base steel sheet, thereby making it possible to reduce the standard deviation σ of the film coating weight distribution. From this point of view, the film coating weight W per side is preferably 0.3 g/m² or more, and particularly preferably 0.5 g/m² or more. However, as already described, an excessively high film coating weight W may lead to deterioration in film removability. Thus, the film coating weight W per side is preferably 2.0 g/m² or less. The film coating weight W per side is more preferably 1.5 g/m² or less, and particularly preferably 0.9 g/m² or less. If the paint viscosity is too low, the paint tends to accumulate in depressions and is small in thickness on projections, with the result that the standard deviation σ of the film coating weight distribution may be increased to 0.9 g/m² or more. From these points of view, it is preferable that the viscosity of the paint be 1.5 mPa·s or more. If, on the other hand, the paint viscosity is too high, the paint that is applied tends to be nonuniform and may form a film with a poor appearance, such as streaks. Thus, it is preferable that the viscosity of the paint be 8.0 mPa·s or less.

Furthermore, long drying allows the wet paint to spread before the film is dried, and the paint tends to accumulate in depressions and is small in thickness on projections, with the result that the area fraction of thinner portions of the film may be increased to 25% or more. The area fraction of thinner portions of the film may be reduced to 25% or less by elevating the drying temperature as much as possible and shortening the drying time while ensuring that the film satisfies the desired characteristics. The drying temperature is preferably 60° C. or above, and particularly preferably 80° C. or above. As described hereinabove, if the drying temperature exceeds 140° C., the wax particles are melted and combine and the coarsening of particles may deteriorate the lubricity. Thus, it is preferable that the drying temperature be 140° C. or below. The drying time is preferably 150 seconds or less, more preferably 120 seconds or less, and particularly preferably 60 seconds or less. However, excessively short drying does not fully dry the paint and may result in poor corrosion resistance. Thus, the drying time is preferably 2 seconds or more, and particularly preferably 4 seconds or more.

As described above, the standard deviation σ of the film coating weight distribution may be reduced to less than 0.9 g/m² by appropriately controlling the film coating weight of the film per side, the paint viscosity, and the paint drying time.

EXAMPLES

Aspects of the present invention will be described below based on EXAMPLES. The present invention is not limited to EXAMPLES below.

Cold rolled steel sheets (steel sheets Nos. A to C) 0.8 mm in thickness and hot rolled steel sheets (steel sheets Nos. D, E, and F) 2.0 mm in thickness were used as base steel sheets. The arithmetic average roughnesses Ra of these steel sheets are described in Table 1. Paints that had a composition described in Table 2 were applied with a bar coater and were dried with an IH heater so that the maximum temperature reached by the base steel sheet would be 80° C. Thus, steel sheets that had a film containing an organic resin and a wax were obtained. The base steel sheets A to F are SPCD or SPHD having a tensile strength grade of 270 MPa.

TABLE 1

| Base steel sheet | Ra(μm) |
| --- | --- |
| A | 0.48 |
| B | 0.78 |
| C | 1.48 |
| D | 2.35 |
| E | 2.45 |
| F | 2.89 |

TABLE 2

| | | | Wax | | |
| --- | --- | --- | --- | --- | --- |
| Paint No. | Organic resin Type | Type | Fraction of wax in film (mass %) | Average particle size (μm) | Melting point (° C.) |
| 1 | Acrylic | Polyethylene | 20 | 0.06 | 120 |
| 2 | Acrylic | Polyethylene | 20 | 0.05 | 125 |
| 3 | Acrylic | Polyethylene | 20 | 0.3 | 125 |
| 4 | Acrylic | Polyethylene | 20 | 0.05 | 130 |
| 5 | Acrylic | Polyethylene | 20 | 0.15 | 130 |
| 6 | Acrylic | Polyethylene | 20 | 0.6 | 132 |
| 7 | Acrylic | Polyethylene | 20 | 1.0 | 132 |
| 8 | Acrylic | Polyethylene | 20 | 3.0 | 132 |
| 9 | Acrylic | Polyethylene | 20 | 0.05 | 135 |
| 10 | Acrylic | Polyethylene | 20 | 0.3 | 135 |
| 11 | Acrylic | Polyethylene | 20 | 0.06 | 140 |
| 12 | Acrylic | Polyethylene | 20 | 0.2 | 95 |
| 13 | Acrylic | Polyethylene | 20 | 0.6 | 110 |
| 14 | Acrylic | Polyethylene | 20 | 6.0 | 132 |
| 15 | Acrylic | Polypropylene | 20 | 0.03 | 146 |
| 16 | Acrylic | Polypropylene | 20 | 0.06 | 156 |
| 17 | Acrylic | PTFE | 20 | 0.25 | 340 |
| 18 | Acrylic | Polyethylene | 5 | 0.05 | 130 |
| 19 | Acrylic | Polyethylene | 10 | 0.05 | 130 |
| 20 | Acrylic | Polyethylene | 50 | 0.05 | 130 |
| 21 | Acrylic | Polyethylene | 60 | 0.05 | 130 |
| 22 | Epoxy | Polyethylene | 20 | 0.05 | 130 |
| 23 | Urethane | Polyethylene | 20 | 0.05 | 130 |
| 24 | Phenol | Polyethylene | 20 | 0.05 | 130 |
| 25 | Vinyl acetate | Polyethylene | 20 | 0.05 | 130 |
| 26 | Polyester | Polyethylene | 20 | 0.05 | 130 |

(1) Method for Evaluating Press Formability (Sliding Properties)

To evaluate the press formability of the obtained steel sheets, the coefficient of friction of the steel sheets was measured as follows.

Figure 4:
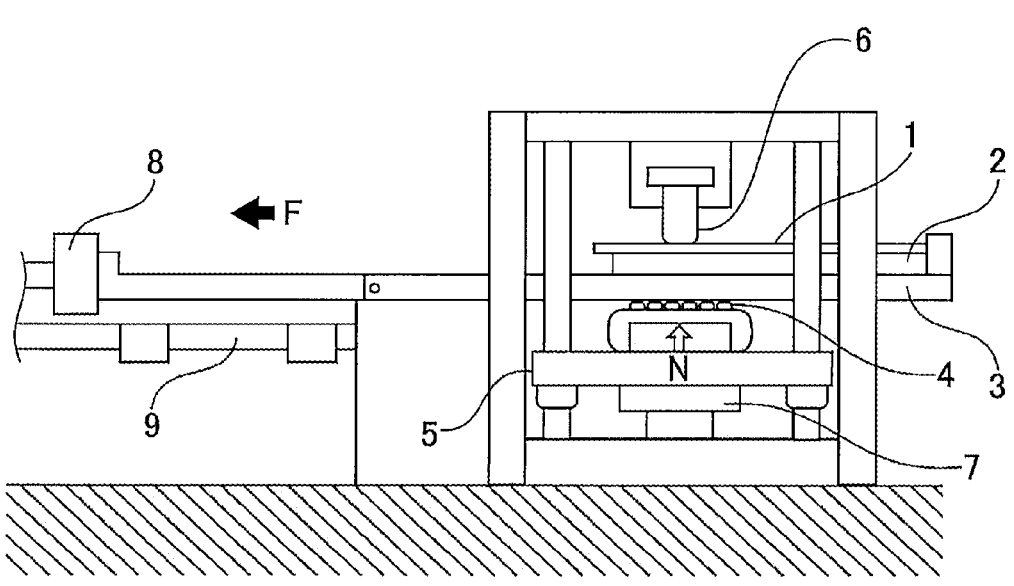
FIG. 4 is a schematic front view illustrating a friction coefficient measuring device.

FIG. 4 is a schematic front view illustrating a friction coefficient measuring device. As illustrated in the figure, a friction coefficient measurement sample 1 taken from the steel sheet is fixed on a sample stage 2, and the sample stage 2 is fixed on the upper face of a horizontally movable slide table 3. A vertically movable slide table support 5 is provided that has rollers 4 in contact with the lower face of the slide table 3. A first load cell 7 is attached to the slide table support 5 to serve as a pusher for the slide table support to measure the pressing load N of a bead 6 to the friction coefficient measurement sample 1. A second load cell 8 is attached to one end of the slide table 3 and is used to measure the sliding resistance force F required to move the slide table 3 in the horizontal direction under the application of the pressing force. The test was conducted after press cleaning oil PRETON (registered trademark) R352L manufactured by SUGIMURA Chemical Industrial Co., Ltd. was applied as a lubricating oil to the surface of the sample 1.

Figure 5:
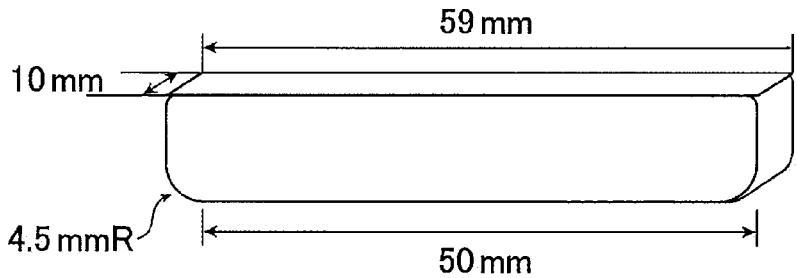
FIG. 5 is a schematic perspective view illustrating the shape and the dimensions of the bead in FIG. 4.

FIG. 5 is a schematic perspective view illustrating the shape and the dimensions of the bead used. The sample 1 is slid while the lower face of the bead 6 is pressed against the surface of the sample. The bead 6 illustrated in FIG. 5 is 10 mm in width and 59 mm in length in the sample sliding direction, and the lower portions at both ends in the sliding direction are curved with a curvature of 4.5 mm R. The lower face of the bead that pushes the sample is a flat face having a width of 10 mm and a length in the sliding direction of 50 mm.

The friction coefficient measurement test was performed using the bead illustrated in FIG. 5 with a pressing load N of 400 kgf and a sample withdrawal speed (a horizontal speed of the slide table 3) of 20 cm/min. The coefficient μ of friction between the test material and the bead was calculated by the equation: $\mu = F/N$.

The slidability was evaluated as excellent (◎) when the coefficient of friction was 0.119 or less. The slidability was evaluated as good (o) when the coefficient of friction was more than 0.119 and 0.130 or less, and was evaluated as insufficient (×) when the coefficient of friction was more than 0.130.

(2) Method for Evaluating Film Removability

Assuming that the steel sheets according to aspects of the present invention would be used in automobile applications, the film removability of the steel sheets at the time of degreasing was evaluated. To determine the film removability of the steel sheets, first, test specimens sampled from the steel sheets were degreased with alkaline degreasing agent Fine Cleaner (registered trademark) E6403 (manufactured by Nihon Parkerizing Co., Ltd.). In this treatment, the test specimen was immersed in a degreasing liquid having a degreasing agent concentration of 20 g/L and a temperature of 40° C. for a predetermined amount of time, and was washed with tap water. The test specimen thus treated was analyzed with a fluorescent X-ray analyzer to measure the surface carbon intensity. The removed film ratio was calculated from the equation below using the measured value and the values measured beforehand of the surface carbon intensity before the degreasing and the surface carbon intensity of the unlubricated steel sheet.

$$\text{Removed film ratio (\%)} = [(\text{carbon intensity before degreasing} -$$
$$\text{carbon intensity after degreasing})/(\text{carbon intensity before degreasing} -$$
$$\text{carbon intensity of unlubricated steel sheet})] \times 100$$

The film removability of the steel sheet was evaluated in accordance with the criteria below based on the immersion time in the alkaline degreasing liquid required until the removed film ratio reached 98% or more. The film removability was judged as acceptable when the rating was ⊚, o, and Δ.

⊚ (very good): Within 15 seconds.

o (good): In more than 15 seconds and within 45 seconds.

Δ (acceptable): In more than 45 seconds and within 120 seconds.

× (poor): In more than 120 seconds.

(3) Method for Evaluating Standard Deviation σ of Film Coating Weight

The standard deviation σ of the film coating weight in the steel sheets was measured as follows.

The steel sheets obtained above were each cut to give five pieces of 10 mm square size as test materials. For the measurement, a Schottky field emission type SEM (Σigma manufactured by Carl Zeiss) equipped with an energy dispersive X-ray spectrometer (XFlash5|30 manufactured by Bruker) was used.

Central portions of the five test materials sampled from each steel sheet were analyzed to obtain intensity maps of C-Kα radiation and Fe-Kα radiation with respect to 800× 600 measurement points at a magnification of 300 times and an acceleration voltage of 15 kV. The C-Kα radiation intensities in the measured map were divided by the corresponding Fe-Kα radiation intensities in the map to calculate the C-Kα/Fe-Kα intensity ratio map. Furthermore, the average value $\mu_{C/Fe}$ of the C-Kα/Fe-Kα intensity ratios and the standard deviation $\mu_{C/Fe}$ were determined from the intensity ratio map. The average value of the five fields of view was used for the evaluation. Furthermore, from the relationship between the average value $\mu_{C/Fe}$ and the film coating weight, the standard deviation $\sigma_{C/Fe}$ of the C-Kα/Fe-Kα intensity ratio was converted into the standard deviation σ of the film coating weight. The standard deviation was evaluated as good (o) when σ determined as described above was less than 0.9 g/m² and as poor (×) when σ was 0.9 g/m² or more.

TABLE 3

| No. | Steel sheet No. | Paint No. | Paint viscosity (mPa · s) | Maximum temperature of base steel sheet reached during drying (° C.) | Drying time (sec) | Film coating weight W (g/m²) | Standard deviation σ of film coating weight distribution (g/m²) | $\sigma_{c/Fe}$ rating | Coefficient of friction Coefficient of friction | Coefficient of friction Rating | Film removability | Remarks |
|---|---|---|---|---|---|---|---|---|---|---|---|---|
| 1 | B | 1 | 5.6 | 80 | 30 | 0.90 | 0.19 | ◯ | 0.116 | ⊚ | ⊚ | INV. EX. |
| 2 | B | 2 | 5.5 | 80 | 30 | 0.90 | 0.13 | ◯ | 0.112 | ⊚ | ⊚ | INV. EX. |
| 3 | B | 3 | 5.6 | 80 | 30 | 0.90 | 0.11 | ◯ | 0.111 | ⊚ | ◯ | INV. EX. |
| 4 | B | 4 | 5.5 | 80 | 30 | 0.90 | 0.11 | ◯ | 0.110 | ⊚ | ⊚ | INV. EX. |
| 5 | B | 5 | 5.5 | 80 | 30 | 0.90 | 0.10 | ◯ | 0.106 | ⊚ | ⊚ | INV. EX. |
| 6 | B | 6 | 5.6 | 80 | 30 | 0.90 | 0.31 | ◯ | 0.120 | ◯ | ⊚ | INV. EX. |
| 7 | B | 7 | 5.7 | 80 | 30 | 0.90 | 0.36 | ◯ | 0.121 | ◯ | ⊚ | INV. EX. |
| 8 | B | 8 | 5.8 | 80 | 30 | 0.90 | 0.46 | ◯ | 0.123 | ◯ | ⊚ | INV. EX. |
| 9 | B | 9 | 5.5 | 80 | 30 | 0.90 | 0.24 | ◯ | 0.112 | ⊚ | ⊚ | INV. EX. |
| 10 | B | 10 | 5.6 | 80 | 30 | 0.90 | 0.18 | ◯ | 0.113 | ⊚ | ⊚ | INV. EX. |
| 11 | B | 11 | 5.5 | 80 | 30 | 0.90 | 0.15 | ◯ | 0.114 | ⊚ | ⊚ | INV. EX. |
| 12 | B | 12 | 5.7 | 80 | 30 | 0.90 | 1.11 | X | 0.159 | X | ◯ | COMP. EX. |
| 13 | B | 13 | 5.7 | 80 | 30 | 0.90 | 1.01 | X | 0.142 | X | ◯ | COMP. EX. |
| 14 | B | 13 | 5.7 | 80 | 30 | 1.50 | 0.93 | X | 0.132 | X | Δ | COMP. EX. |
| 15 | B | 13 | 5.7 | 80 | 30 | 2.00 | 0.95 | X | 0.131 | X | X | COMP. EX. |
| 16 | B | 14 | 6.0 | 80 | 30 | 0.90 | 0.99 | X | 0.139 | X | Δ | COMP. EX. |
| 17 | B | 15 | 5.4 | 80 | 30 | 0.90 | 1.22 | X | 0.167 | X | ◯ | COMP. EX. |
| 18 | B | 16 | 5.5 | 80 | 30 | 0.90 | 1.31 | X | 0.179 | X | ◯ | COMP. EX. |
| 19 | B | 17 | 5.5 | 80 | 30 | 0.90 | 1.24 | X | 0.168 | X | Δ | OMP EX. |

TABLE 3-continued

| No. | Steel sheet No. | Paint No. | Paint viscosity (mPa · s) | Maximum temperature of base steel sheet reached during drying (° C.) | Drying time (sec) | Film coating weight W (g/m²) | Standard deviation σ of film coating weight distribution (g/m²) | $\sigma_{c/Fe}$ rating | Coefficient of friction Coefficient of friction | Coefficient of friction Rating | Film removability | Remarks |
|---|---|---|---|---|---|---|---|---|---|---|---|---|
| 20 | B | 18 | 5.0 | 80 | 30 | 0.90 | 0.92 | X | 0.135 | X | ◎ | COMP. EX. |
| 21 | B | 19 | 5.1 | 80 | 30 | 0.90 | 0.53 | ○ | 0.124 | ○ | ◎ | INV. EX. |
| 22 | B | 20 | 5.8 | 80 | 30 | 0.90 | 0.11 | ○ | 0.102 | ◎ | Δ | INV. EX. |
| 23 | B | 21 | 6.0 | 80 | 30 | 0.90 | 0.10 | ○ | 0.104 | ◎ | Δ | INV. EX. |
| 24 | B | 22 | 5.3 | 80 | 30 | 0.90 | 0.20 | ○ | 0.114 | ◎ | ○ | INV. EX. |
| 25 | B | 23 | 5.7 | 80 | 30 | 0.90 | 0.18 | ○ | 0.111 | ◎ | ◎ | INV. EX. |
| 26 | B | 24 | 5.1 | 80 | 30 | 0.90 | 0.10 | ○ | 0.106 | ◎ | ◎ | INV. EX. |
| 27 | B | 25 | 4.8 | 80 | 30 | 0.90 | 0.22 | ○ | 0.109 | ◎ | ◎ | INV. EX. |
| 28 | B | 26 | 4.6 | 80 | 30 | 0.90 | 0.25 | ○ | 0.108 | ◎ | ◎ | INV. EX. |
| 29 | B | 4 | 5.5 | 80 | 30 | 0.20 | 0.98 | X | 0.154 | X | ◎ | COMP. EX |
| 30 | B | 4 | 5.5 | 80 | 30 | 0.30 | 0.68 | ○ | 0.124 | ○ | ◎ | INV. EX. |
| 31 | B | 4 | 5.5 | 80 | 30 | 0.40 | 0.54 | ○ | 0.117 | ◎ | ◎ | INV. EX. |
| 32 | B | 4 | 5.5 | 80 | 30 | 1.50 | 0.09 | ○ | 0.107 | ◎ | ○ | INV. EX. |
| 33 | B | 4 | 5.5 | 80 | 30 | 2.00 | 0.08 | ○ | 0.110 | ◎ | Δ | INV. EX. |
| 34 | B | 4 | 5.5 | 80 | 30 | 2.50 | 0.07 | ○ | 0.110 | ◎ | X | INV. EX. |
| 35 | B | 4 | 5.5 | 80 | 30 | 3.00 | 0.06 | ○ | 0.105 | ◎ | X | INV. EX. |
| 36 | B | 4 | 1.4 | 80 | 30 | 0.90 | 0.94 | X | 0.132 | X | ◎ | COMP. EX. |
| 37 | B | 4 | 1.5 | 80 | 30 | 0.90 | 0.76 | ○ | 0.127 | ○ | ◎ | INV. EX. |
| 38 | B | 4 | 3.1 | 80 | 30 | 0.90 | 0.64 | ○ | 0.119 | ◎ | ◎ | INV. EX. |
| 39 | B | 4 | 8.0 | 80 | 30 | 0.90 | 0.72 | ○ | 0.122 | ○ | ◎ | INV. EX. |
| 40 | B | 4 | 8.2 | 80 | 30 | 0.90 | 0.93 | X | 0.131 | X | ◎ | COMP. EX. |
| 41 | B | 4 | 5.5 | 55 | 30 | 0.90 | 0.95 | X | 0.133 | X | ◎ | COMP. EX |
| 42 | B | 4 | 5.5 | 60 | 30 | 0.90 | 0.58 | ○ | 0.127 | ○ | ◎ | INV. EX. |
| 43 | B | 4 | 5.5 | 110 | 30 | 0.90 | 0.10 | ○ | 0.108 | ◎ | ◎ | INV. EX. |
| 44 | B | 4 | 5.5 | 140 | 30 | 0.90 | 0.10 | ○ | 0.106 | ◎ | Δ | INV. EX. |
| 45 | B | 4 | 5.5 | 150 | 30 | 0.90 | 0.91 | X | 0.133 | X | X | COMP. EX. |
| 46 | B | 4 | 5.5 | 80 | 1 | 0.90 | 0.93 | X | 0.136 | X | ◎ | COMP. EX. |
| 47 | B | 4 | 5.5 | 80 | 2 | 0.90 | 0.76 | ○ | 0.129 | ○ | ◎ | INV. EX. |
| 48 | B | 4 | 5.5 | 80 | 4 | 0.90 | 0.45 | ○ | 0.118 | ◎ | ◎ | INV. EX. |
| 49 | B | 4 | 5.5 | 80 | 60 | 0.90 | 0.23 | ○ | 0.114 | ◎ | ◎ | INV. EX. |
| 50 | B | 4 | 5.5 | 80 | 90 | 0.90 | 0.10 | ○ | 0.108 | ◎ | ◎ | INV. EX. |
| 51 | B | 4 | 5.5 | 80 | 120 | 0.90 | 0.17 | ○ | 0.115 | ◎ | ◎ | INV. EX. |
| 52 | B | 4 | 5.5 | 80 | 150 | 0.90 | 0.47 | ○ | 0.126 | ○ | ◎ | INV. EX. |
| 53 | B | 4 | 5.5 | 80 | 160 | 0.90 | 0.92 | X | 0.132 | X | ◎ | COMP. EX |
| 54 | B | — | — | — | — | No film | — | — | 0.175 | X | ◎ | COMP. EX. |

TABLE 4

| No. | Steel sheet No. | Paint No. | Paint viscosity (mPa · s) | Maximum temperature of base steel sheet reached during drying (° C.) | Drying time (sec) | Film coating weight W (g/m²) | Standard deviation σ of film coating weight distribution (g/m²) | $\sigma_{c/Fe}$ rating | Coefficient of friction Coefficient of friction | Coefficient of friction Rating | Film removability | Remarks |
|---|---|---|---|---|---|---|---|---|---|---|---|---|
| 55 | C | 1 | 5.6 | 80 | 30 | 0.90 | 0.41 | ○ | 0.119 | ◎ | ◎ | INV. EX. |
| 56 | C | 2 | 5.5 | 80 | 30 | 0.90 | 0.33 | ○ | 0.114 | ◎ | ◎ | INV. EX. |
| 57 | C | 3 | 5.6 | 80 | 30 | 0.90 | 0.35 | ○ | 0.113 | ◎ | ◎ | INV. EX. |
| 58 | C | 4 | 5.5 | 80 | 30 | 0.90 | 0.31 | ○ | 0.112 | ◎ | ◎ | INV. EX. |

TABLE 4-continued

| No. | Steel sheet No. | Paint No. | Paint viscosity (mPa · s) | Maximum temperature of base steel sheet reached during drying (° C.) | Drying time (sec) | Film coating weight W (g/m²) | Standard deviation σ of film coating weight distribution (g/m²) | σ_{c/Fe} rating | Coefficient of friction | Rating | Film removability | Remarks |
|---|---|---|---|---|---|---|---|---|---|---|---|---|
| 59 | C | 5 | 5.5 | 80 | 30 | 0.90 | 0.29 | ○ | 0.110 | ◎ | ◎ | INV. EX. |
| 60 | C | 6 | 5.6 | 80 | 30 | 0.90 | 0.56 | ○ | 0.123 | ○ | ◎ | INV. EX. |
| 61 | C | 7 | 5.7 | 80 | 30 | 0.90 | 0.66 | ○ | 0.125 | ○ | ◎ | INV. EX. |
| 62 | C | 8 | 5.8 | 80 | 30 | 0.90 | 0.64 | ○ | 0.126 | ○ | ◎ | INV. EX. |
| 63 | C | 9 | 5.5 | 80 | 30 | 0.90 | 0.35 | ○ | 0.113 | ◎ | ◎ | INV. EX. |
| 64 | C | 10 | 5.6 | 80 | 30 | 0.90 | 0.33 | ○ | 0.112 | ◎ | ◎ | INV. EX. |
| 65 | C | 11 | 5.5 | 80 | 30 | 0.90 | 0.41 | ○ | 0.118 | ◎ | ◎ | INV. EX. |
| 66 | C | 12 | 5.7 | 80 | 30 | 0.90 | 1.54 | X | 0.167 | X | ○ | COMP. EX. |
| 67 | C | 13 | 5.7 | 80 | 30 | 0.90 | 1.44 | X | 0.153 | X | ○ | COMP. EX. |
| 68 | C | 13 | 5.7 | 80 | 30 | 1.50 | 1.31 | X | 0.150 | X | Δ | COMP. EX. |
| 69 | C | 13 | 5.7 | 80 | 30 | 2.00 | 1.12 | X | 0.146 | X | X | COMP. EX. |
| 70 | C | 14 | 6.0 | 80 | 30 | 0.90 | 1.23 | X | 0.139 | X | Δ | COMP. EX. |
| 71 | C | 15 | 5.4 | 80 | 30 | 0.90 | 1.45 | X | 0.178 | X | ○ | COMP. EX. |
| 72 | C | 16 | 5.5 | 80 | 30 | 0.90 | 1.57 | X | 0.183 | X | ○ | COMP. EX. |
| 73 | C | 17 | 5.5 | 80 | 30 | 0.90 | 1.49 | X | 0.146 | X | Δ | COMP. EX. |
| 74 | C | 18 | 5.0 | 80 | 30 | 0.90 | 1.51 | X | 0.167 | X | ◎ | COMP. EX. |
| 75 | C | 19 | 5.1 | 80 | 30 | 0.90 | 0.78 | ○ | 0.129 | ○ | ◎ | INV. EX. |
| 76 | C | 20 | 5.8 | 80 | 30 | 0.90 | 0.29 | ○ | 0.113 | ◎ | Δ | INV. EX. |
| 77 | C | 21 | 6.0 | 80 | 30 | 0.90 | 0.23 | ○ | 0.110 | ◎ | Δ | INV. EX. |
| 78 | C | 22 | 5.3 | 80 | 30 | 0.90 | 0.43 | ○ | 0.119 | ◎ | ○ | INV. EX. |
| 79 | C | 23 | 5.7 | 80 | 30 | 0.90 | 0.45 | ○ | 0.119 | ◎ | ◎ | INV. EX. |
| 80 | C | 24 | 5.1 | 80 | 30 | 0.90 | 0.28 | ○ | 0.107 | ◎ | ◎ | INV. EX. |
| 81 | C | 25 | 4.8 | 80 | 30 | 0.90 | 0.44 | ○ | 0.118 | ◎ | ◎ | INV. EX. |
| 82 | C | 26 | 4.6 | 80 | 30 | 0.90 | 0.49 | ○ | 0.117 | ◎ | ◎ | INV. EX. |
| 83 | C | 4 | 5.5 | 80 | 30 | 0.40 | 0.92 | X | 0.164 | X | ◎ | COMP. EX. |
| 84 | C | 4 | 5.5 | 80 | 30 | 0.50 | 0.65 | ○ | 0.127 | ○ | ◎ | INV. EX. |
| 85 | C | 4 | 5.5 | 80 | 30 | 0.80 | 0.39 | ○ | 0.114 | ◎ | ◎ | INV. EX. |
| 86 | C | 4 | 5.5 | 80 | 30 | 1.50 | 0.27 | ○ | 0.110 | ◎ | ○ | INV. EX. |
| 87 | C | 4 | 5.5 | 80 | 30 | 2.00 | 0.22 | ○ | 0.108 | ◎ | X | INV. EX. |
| 88 | C | 4 | 5.5 | 80 | 30 | 3.00 | 0.19 | ○ | 0.107 | ◎ | X | INV. EX. |
| 89 | C | — | — | — | — | No film | — | — | 0.178 | X | ◎ | COMP. EX. |

TABLE 5

| No. | Steel sheet No. | Paint No. | Paint viscosity (mPa · s) | Maximum temperature of base steel sheet reached during drying (° C.) | Drying time (sec) | Film coating weight W (g/m²) | Standard deviation σ of film coating weight distribution (g/m²) | σ_{c/Fe} rating | Coefficient of friction | Rating | Film removability | Remarks |
|---|---|---|---|---|---|---|---|---|---|---|---|---|
| 90 | A | 4 | 5.5 | 80 | 30 | 0.20 | 0.92 | X | 0.167 | X | ◎ | COMP. EX. |
| 91 | A | 4 | 5.5 | 80 | 30 | 0.25 | 0.86 | ○ | 0.125 | ○ | ◎ | INV. EX. |
| 92 | A | 4 | 5.5 | 80 | 30 | 0.30 | 0.45 | ○ | 0.117 | ◎ | ◎ | INV. EX. |
| 93 | A | 4 | 5.5 | 80 | 30 | 0.70 | 0.24 | ○ | 0.112 | ◎ | ◎ | INV. EX. |
| 94 | A | 4 | 5.5 | 80 | 30 | 1.40 | 0.09 | ○ | 0.108 | ◎ | ○ | INV. EX. |
| 95 | A | 4 | 5.5 | 80 | 30 | 2.00 | 0.06 | ○ | 0.109 | ◎ | Δ | INV. EX. |
| 96 | A | — | — | — | — | No film | — | — | 0.184 | X | ◎ | COMP. EX. |
| 97 | D | 4 | 5.5 | 80 | 30 | 0.70 | 0.96 | X | 0.146 | X | ◎ | COMP. EX. |
| 98 | D | 4 | 5.5 | 80 | 30 | 0.90 | 0.84 | ○ | 0.127 | ○ | ◎ | INV. EX. |
| 99 | D | 4 | 5.5 | 80 | 30 | 1.30 | 0.47 | ○ | 0.124 | ○ | ○ | INV. EX. |
| 100 | D | 4 | 5.5 | 80 | 30 | 1.60 | 0.34 | ○ | 0.116 | ◎ | ○ | INV. EX. |
| 101 | D | 4 | 5.5 | 80 | 30 | 2.00 | 0.27 | ○ | 0.111 | ◎ | Δ | INV. EX. |
| 102 | D | 13 | 5.7 | 80 | 30 | 0.90 | 1.32 | X | 0.185 | X | ◎ | COMP. EX. |
| 103 | D | 13 | 5.7 | 80 | 30 | 1.50 | 1.19 | X | 0.184 | X | ○ | COMP. EX. |
| 104 | D | — | — | — | — | No film | — | — | 0.174 | X | ◎ | COMP. EX. |

TABLE 5-continued

| No. | Steel sheet No. | Paint No. | Paint viscosity (mPa · s) | Maximum temperature of base steel sheet reached during drying (° C.) | Drying time (sec) | Film coating weight W (g/m$^2$) | Standard deviation σ of film coating weight distribution (g/m$^2$) | σ$_{c/Fe}$ rating | Coefficient of friction | Rating | Film removability | Remarks |
|---|---|---|---|---|---|---|---|---|---|---|---|---|
| 105 | E | 4 | 5.5 | 80 | 30 | 0.70 | 0.98 | X | 0.167 | X | ◎ | COMP. EX. |
| 106 | E | 4 | 5.5 | 80 | 30 | 0.90 | 0.88 | ○ | 0.128 | ○ | ◎ | INV. EX. |
| 107 | E | 4 | 5.5 | 80 | 30 | 1.40 | 0.49 | ○ | 0.124 | ○ | ○ | INV. EX. |
| 108 | E | 4 | 5.5 | 80 | 30 | 2.00 | 0.35 | ○ | 0.118 | ◎ | ○ | INV. EX. |
| 109 | E | — | — | — | — | No film | — | — | 0.188 | X | ◎ | COMP. EX. |
| 110 | F | 4 | 5.5 | 80 | 30 | 0.90 | 1.13 | X | 0.143 | X | ◎ | COMP. EX. |
| 111 | F | 4 | 5.5 | 80 | 30 | 1.40 | 0.91 | X | 0.136 | X | ○ | COMP. EX. |
| 112 | F | 4 | 5.5 | 80 | 30 | 2.00 | 0.83 | ○ | 0.129 | ○ | Δ | INV. EX. |
| 113 | IF | — | — | — | — | No film | — | — | 0.189 | X | ◎ | COMP. EX. |

From Tables 3 to 5, all the steel sheets of INVENTIVE EXAMPLES have excellent press formability. In contrast, all the steel sheets of COMPARATIVE EXAMPLES that do not have the technical features of aspects of the present invention are poor in press formability. Furthermore, excellent film removability was obtained when the mass fraction of the wax in the film was less than 50 mass % and the coating weight of the film per side was 2.0 g/m$^2$ or less.

INDUSTRIAL APPLICABILITY

The steel sheet according to aspects of the present invention excels in press formability and film removability, and can be used in a broad range of fields mainly based on automobile bodies.

REFERENCE SIGNS LIST

1 FRICTION COEFFICIENT MEASUREMENT SAMPLE
2 SAMPLE STAGE
3 SLIDE TABLE
4 ROLLER
5 SLIDE TABLE SUPPORT
6 BEAD
7 FIRST LOAD CELL
8 SECOND LOAD CELL
9 RAIL

The invention claimed is:
1. A steel sheet comprising a base steel sheet and a film disposed on at least one side of the base steel sheet, wherein
the film comprises an organic resin and a wax,
an arithmetic average roughness Ra of the base steel sheet is 0.4 μm or more,
the organic resin is at least one resin selected from acrylic resins, epoxy resins, urethane resins, phenolic resins, vinyl acetate resins, and polyester resins,
the wax is a polyolefin wax with a melting point of 120° C. or above and 140°° C. or below and an average particle size of 3.0 μm or less,
a fraction of the wax in the film is 10 mass % or more, and a standard deviation σ of a film coating weight distribution per side is less than 0.9 g/m$^2$.
2. The steel sheet according to claim 1, wherein a film coating weight W per side is 2.0 g/m$^2$ or less.
3. The steel sheet according to claim 2, wherein the film coating weight W per side is 0.9 g/m$^2$ or less.
4. The steel sheet according to claim 1, wherein the arithmetic average roughness Ra of the base steel sheet is 0.4 μm or more and 2.5 μm or less.
5. The steel sheet according to claim 1, wherein the average particle size of the wax is 0.01 μm or more and 0.5 μm or less.
6. The steel sheet according to claim 1, wherein the fraction of the wax in the film is less than 50 mass %.
7. The steel sheet according to claim 1, wherein the organic resin is an alkali-soluble resin.
8. A steel sheet production method for producing the steel sheet described in claim 1, comprising applying a paint comprising the organic resin and the wax described in claim 1 to at least one side of the base steel sheet, and drying the paint.
9. The steel sheet production method according to claim 8, wherein the paint has a viscosity of 1.5 mPa·s or more and 8.0 mPa·s or less.
10. The steel sheet production method according to claim 9, wherein the maximum temperature of the base steel sheet reached during the drying is 60° C. or above and 140° C. or below, and the drying time in the drying is 2 seconds or more and 150 seconds or less.
11. The steel sheet production method according to claim 8, wherein the maximum temperature of the base steel sheet reached during the drying is 60° C. or above and 140° C. or below, and the drying time in the drying is 2 seconds or more and 150 seconds or less.
12. The steel sheet according to claim 1, wherein the steel sheet has a coefficient of friction of 0.130 or less.
13. The steel sheet according to claim 1, wherein the film may be removed from the steel sheet within 120 seconds after being immersed in a degreasing liquid having a degreasing agent concentration of 20 g/L and a temperature of 40° C. and washed with tap water.

* * * * *